US009679480B2

(12) United States Patent
Hakeem

(10) Patent No.: US 9,679,480 B2
(45) Date of Patent: Jun. 13, 2017

(54) VEHICLE DRIVER RESPONSIBILITY FACTOR ASSESSMENT AND BROADCAST

(71) Applicant: Ford Global Technologies, LLC, Dearborn, MI (US)

(72) Inventor: Mohannad Abdullah Hakeem, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/820,847

(22) Filed: Aug. 7, 2015

(65) Prior Publication Data
US 2017/0039848 A1 Feb. 9, 2017

(51) Int. Cl.
*G08G 1/052* (2006.01)
*H04M 1/725* (2006.01)
*G08G 1/01* (2006.01)
*G06Q 40/08* (2012.01)

(52) U.S. Cl.
CPC ............. *G08G 1/052* (2013.01); *G06Q 40/08* (2013.01); *G08G 1/0112* (2013.01); *H04M 1/72547* (2013.01)

(58) Field of Classification Search
CPC ...... G08G 1/052; G08G 1/0112; G06Q 40/08; H04M 1/72547
See application file for complete search history.

(56) References Cited

U.S. PATENT DOCUMENTS

| 8,160,764 | B2 | 4/2012 | Chol et al. |
| 8,799,034 | B1 | 8/2014 | Brandmaier et al. |
| 2004/0102984 | A1 | 5/2004 | Wahibin et al. |
| 2012/0071151 | A1* | 3/2012 | Abramson ............... H04L 67/12 455/418 |
| 2015/0058045 | A1 | 2/2015 | Santora |
| 2015/0127570 | A1* | 5/2015 | Doughty ................ G06Q 10/00 705/325 |

FOREIGN PATENT DOCUMENTS

| JP | 2005032027 A | 2/2005 |
| JP | 2010198552 A | 9/2010 |
| JP | 2011150579 A | 8/2011 |

* cited by examiner

*Primary Examiner* — Leon Flores
(74) *Attorney, Agent, or Firm* — Frank A. MacKenzie; Brooks Kushman P.C.

(57) ABSTRACT

A vehicle includes one or more controllers that, in response to identification of an accident involving the vehicle, transmit a parameter indicative of a degree to which a driver of the vehicle is at fault for the accident. The parameter is based on data collected by another vehicle that was within a predetermined distance from a location of the vehicle at a time of the accident.

15 Claims, 3 Drawing Sheets

VEHICLE DRIVER RESPONSIBILITY FACTOR ASSESSMENT AND BROADCAST

TECHNICAL FIELD

This application is generally related to a system in a vehicle configured to estimate a responsibility factor related to an accident and selectively broadcast the factor.

BACKGROUND

Drivers of vehicles have a constantly growing amount of information to observe and process to maneuver safely while driving on the open road. Drivers must not only know about and adhere to the rules of the road in their own right, but they must also be aware of what nearby vehicles are doing. Vehicle to vehicle (V2V) and vehicle to infrastructure (V2I) systems allow vehicles to communicate and share information allowing the drivers to focus on operation of the vehicle. A goal of the vehicular communication system is to support active safety vehicle features in avoiding and notifying of accidents and traffic congestions by taking advantage of the information exchange with the surrounding vehicle and road infrastructure stations. The features supported by V2V and V2I communication include vehicle diagnostics, vehicle assistance, intersection control, collision warning, and co-operative adaptive cruise control. These services usually require multiple radio links in order to monitor surroundings of the vehicle including other vehicles and the roadway infrastructure.

SUMMARY

A vehicle includes at least one controller configured to, in response to identification of an accident involving the vehicle, transmit a parameter that is based on data collected by an other vehicle that was within a predetermined distance from a location of the vehicle at a time of the accident. The parameter is indicative of a degree to which a driver of the vehicle is at fault for the accident.

A vehicle includes at least one controller configured to, in response to identification of an accident involving the vehicle, transmit a parameter indicative of a degree to which a driver of the vehicle is at fault for the accident that is based on a number of key presses of a mobile device keypad within a predetermined time before the accident. The keypad is coupled with an infotainment system in the vehicle.

A method of broadcasting data associated with an accident of a vehicle includes receiving infotainment data, recorded at a time of an accident and a predetermined time prior to the accident, from an other vehicle in a vicinity of the vehicle, and transmitting, via an RF transmitter, a fault assessment based on the infotainment data and indicative of a degree to which a driver of the vehicle is at fault for the accident.

DETAILED DESCRIPTION

Figure 1A:
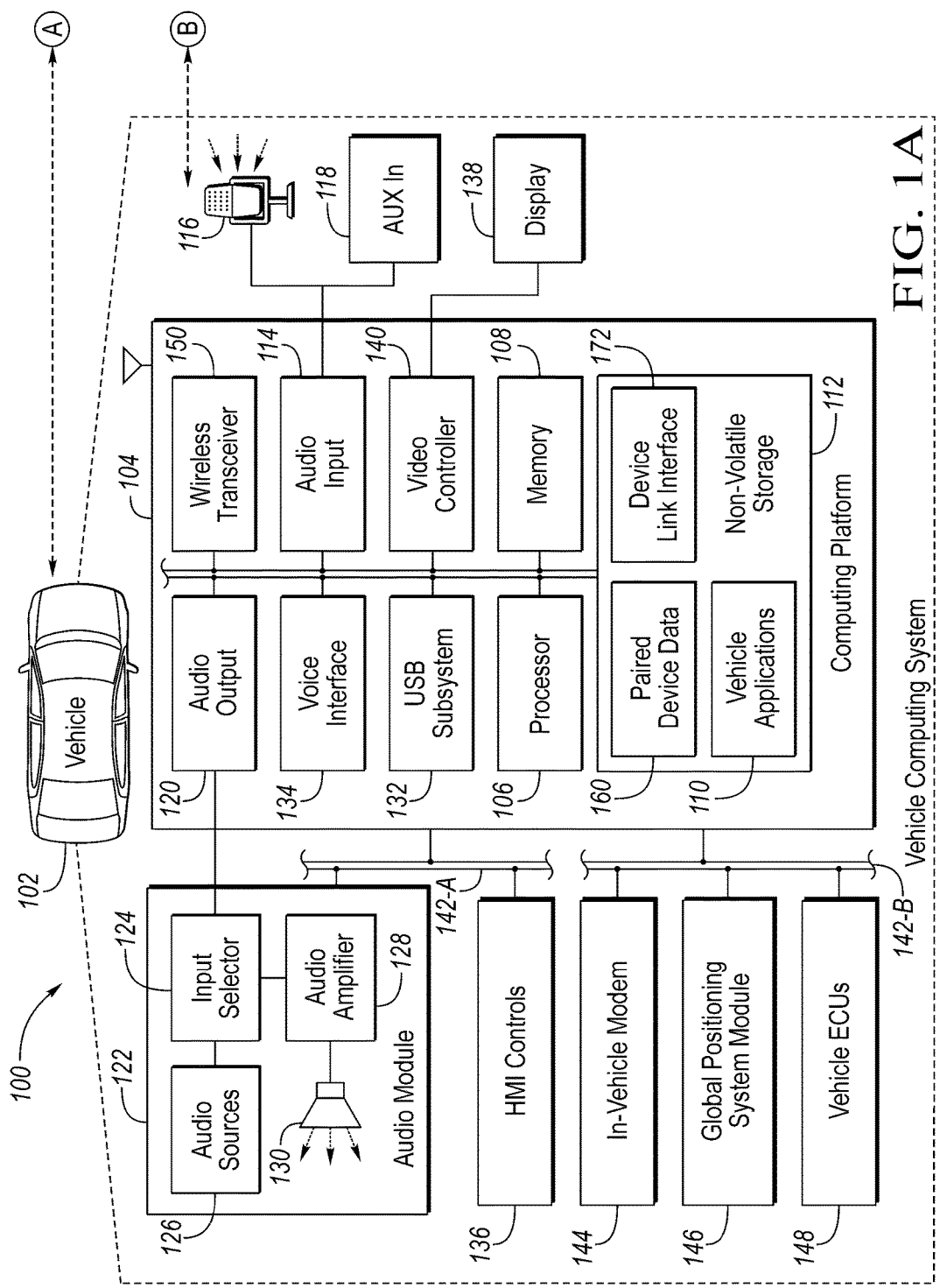
FIGS. 1A and 1B are an exemplary block topology of a vehicle infotainment system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes communication systems and methods for vehicle to vehicle (V2V) and vehicle to infrastructure (V2I) communication. After a motor vehicle accident has occurred, the events prior to an accident may be difficult to determine after the accident has occurred. The data available from multiple Electronic Control Modules (ECUs) in a vehicle at the time of the accident may be beneficial in accident reconstruction. For example, consider an accident between a 'vehicle' and an 'other vehicle'. Vehicles involved in an accident may broadcast information regarding the accident. The information may include vehicle data and driver data. The vehicle data and driver data may be transmitted upon a receiving a request from the other vehicle involved in the accident, or may be transmitted upon a signal from an ECU in the vehicle indicative of the accident. The request from another vehicle may include a time stamp associated with a time of the accident, and data about the other vehicle. The other vehicle data may include a Vehicle Identification Number (VIN) or other data indicative of a make, model, and color of the other vehicle, a license plate of the other vehicle and insurance information associated with the other vehicle. Other associated information that may be provided with the vehicle identification includes a current location of the vehicle, a current time, a location associated with an event and a time associated with the event. Upon receiving a request from the other vehicle involved in the accident, the vehicle may validate the request by comparing the time stamp associated with the request from the other vehicle with data from ECUs in the vehicle providing a time stamp determined from the vehicle. If the time stamp data from the vehicle and the other vehicle is within a predetermined time window (e.g., ½ sec, 50 milliseconds, 10 milliseconds) the vehicle may transmit a response to the request. Also, the vehicle may validate the request by comparing a location associated with the accident sent from the other vehicle with data from ECUs in the vehicle providing a location determined by the vehicle. If the accident location from the vehicle and the other vehicle is within a predetermined distance (e.g., ½ mile, 50 feet, 10 feet) the vehicle may transmit a response to the request. The response may include vehicle data and driver data. Upon receiving vehicle data and driver data The communication may be a Radio Frequency (RF) communication and may be received by the other vehicle. The other vehicle, upon reception of the information, may process the information including decoding the information and updating the information. Typically, a message sent by a vehicle is broadcast to all surrounding vehicles, including the other vehicle and surrounding vehicles. However, the communication may also include transmission and reception of RF signals from a vehicle infrastructure. The vehicle infrastructure may include data including traffic light timing, road conditions, road traffic, weather conditions, and emergency vehicle operation. This may include images from camera systems in a vicinity of the accident. The RF communication may be integrated with a vehicle infotainment system, may be a standalone embedded modem, or may be a passenger's mobile phone coupled with an infotainment system.

Figure 1B:
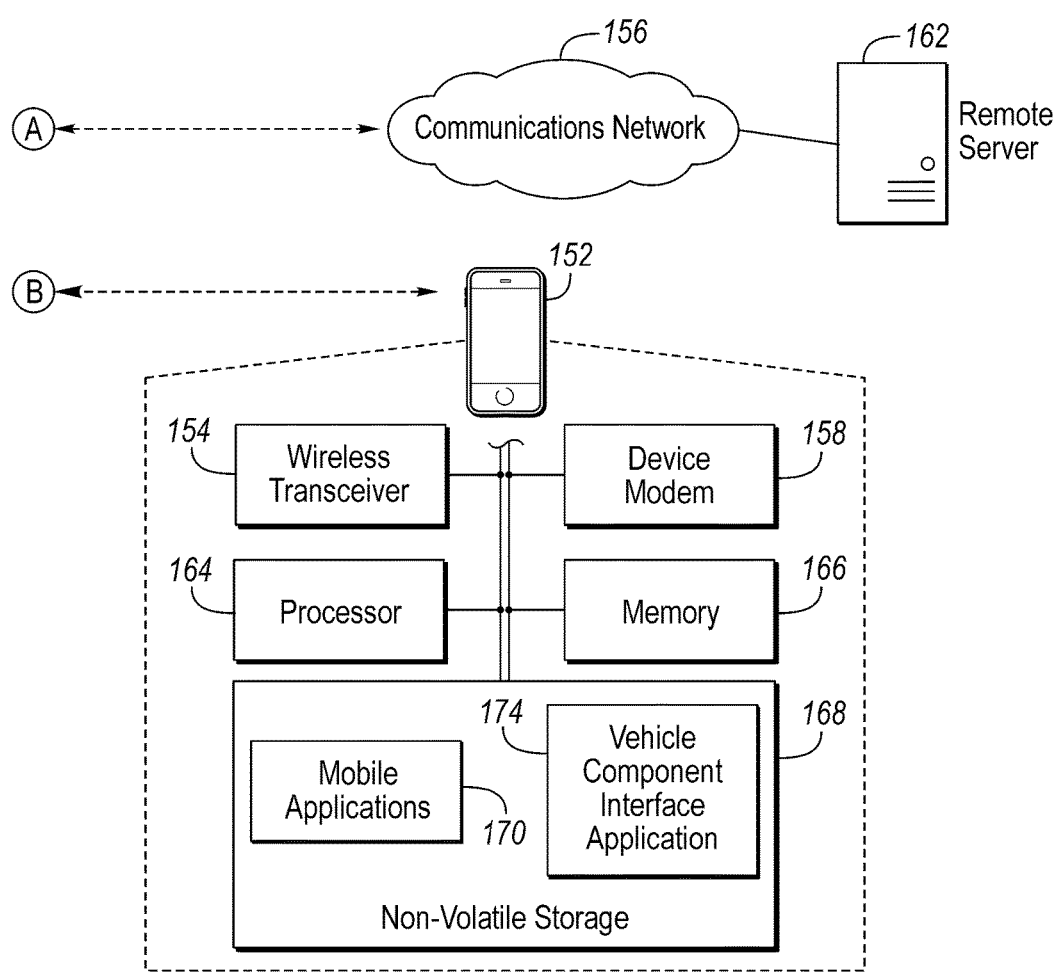

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor may also be multiple processors in multiple computing units which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while WiFi and Bluetooth may operate at frequencies including frequencies over 2 GHz such as 2.4 GHz. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified, and a definition of the user interface to display may be provided to the identified vehicle component interface application 174 for display to the user.

Systems such as the system 100 and system 200 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device 152 to have been paired with or be in communication with the computing platform 104.

Figure 2:
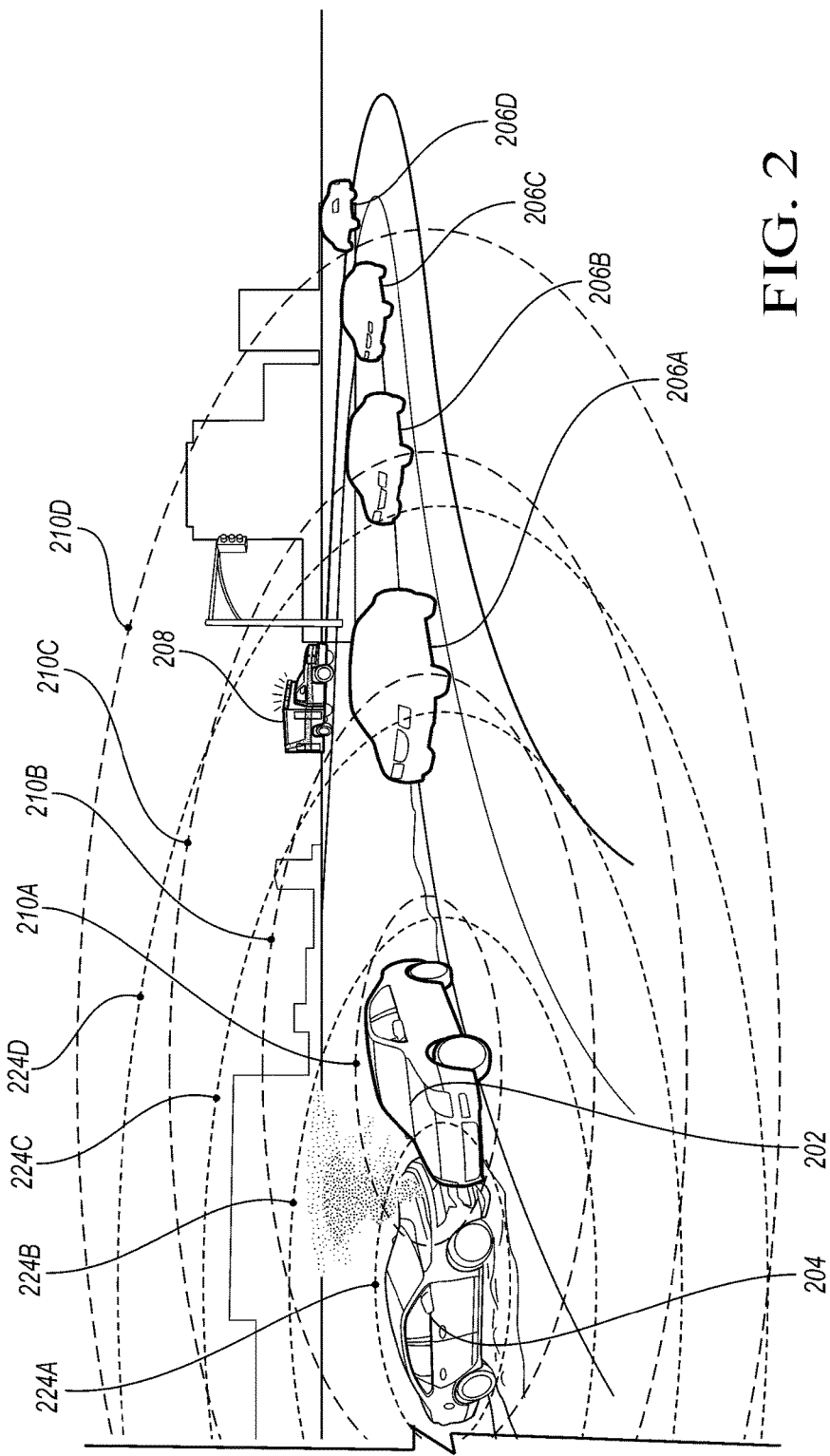
FIG. 2 is an exemplary illustration of a vehicle communication system relaying information between vehicles and a vehicular infrastructure.

FIG. 2 is an exemplary illustration of a vehicle communication system 200 for sharing information between vehicles in the event of an accident and between a vehicle and a vehicular infrastructure in the event of an accident. The communication system 200 illustrates a vehicle 202 encountering an accident with another vehicle 204 also referred to as an other vehicle, however, the accident may be with an object in the roadway, or with an object off the roadway. At a time of an accident, vehicles involved in the accident (such as vehicles 202 and 204) may contain vehicle data and driver data in systems of the vehicles. The vehicle data and driver data at the time of the accident may provide information regarding the operation of each vehicle that may be used to determine a degree to which a driver of the vehicle is at fault for the accident. For example, a vehicle may have a record of a speed of the vehicle at a time of the accident, the speed may be data from a module such as a power train control module (PCM) and may be based a rotational speed of a component such as a driveshaft or a wheel, or may be based on navigation data from a GPS module within the vehicle. The record of speed may be an instantaneous speed at the time of the accident or may be a profile of the speed at a time encompassing the accident. A time encompassing the accident includes a predetermined time prior to the accident and a predetermined time after the accident. Vehicle data also may include a profile of braking force. The profile of braking force may be based on movement of a brake pedal in relation to time, or data from an Anti-lock Brake System (ABS).

An accident may be determined by data from accelerometers, a signal from an airbag module such a signal from the airbag module indicative of a deployment of an airbag. It could be from a side pressure sensor module indicative of a side vehicle impact or from a rear sensor indicative of a rear impact collision.

Driver data may include infotainment data and data associated with devices coupled to an infotainment system. For example, infotainment data may include a log of text messages transferred to a phone that is electrically coupled to an infotainment system in a vehicle. And infotainment data may include a log of key presses such as key presses to a user interface of the infotainment system or key presses to a mobile phone coupled with the infotainment system. The log of key presses may include a rate of key presses, or a number of key presses, a signal indicative of phone activity, and a signal indicative of hands-free operation of the phone.

Also, vehicle data may include data from a variety of ECUs 148 including a powertrain control system, a traction control system, a transmission control system, an electronic power steering system, a stability control system, or an automatic brake system. The vehicle data may be indicative of a speed of a vehicle, a steering wheel angle, an acceleration of the steering wheel, a rotational speed of each wheel of the vehicle, an acceleration of the vehicle, an acceleration of a wheel of the vehicle, a depression of an accelerator pedal, a depression of a brake pedal, or forces exhibited on/by the vehicle. The forces may be indicative of yaw, pitch, and roll force vectors. The driver data may include data from an infotainment system, a passenger restraint system, or a passenger facing camera system. The driver data may be indicative of a gaze angle of the driver, usage of a seat belt, a level of alertness of the driver, or a position of the hands of the driver.

A level of alertness of the driver may include detection of the driver's eyes being closed for a predetermined period of time indicative of the driver being in a state sleep while driving. A position of the hands of the driver may include depression of keys on an infotainment system indicative of the driver changing a radio station.

The vehicle data and driver data may be data from the systems at a point in time, such as at the time of impact, or the data may include a profile of data over a time period. The time of impact may be determined based on signals from accelerometers that are indicative of the accident. The signals from accelerometers indicative of the accident may be used to trigger the deployment of an airbag, and may trigger the recording of vehicle and driver data. The time period may encompass the accident or the trigger, for example, a time period of 10 seconds prior to the accident may be recorded. Also, the time period may be variable based on a speed of the vehicle, for example, a vehicle traveling at 60 MPH may be able to stop in approximately 7 seconds, adding a driver reaction time of 1 second and an extra 1 second to capture data pre-reaction time, a variable based time may be 9 seconds. Another example of a variable time period includes a vehicle traveling at 40 MPH that may be able to stop in approximately 4 seconds, adding a driver reaction time of 1 second and an extra 1 second to capture data pre-reaction time, a variable based time may be 6 seconds. The variable time period may also vary based on vehicle data, such as data indicative of slippery roads (e.g., icy or wet roads).

The vehicle may also receive data from a roadway infrastructure. The roadway infrastructure (e.g., vehicle infrastructure or infrastructure) may include buildings, traffic signals, roadway access points, roadway cameras, and databases regarding road conditions, weather, or traffic. In the event of an accident with an object in the roadway or off the roadway, the vehicle may request data from a road infrastructure to help assess a level of fault. The infrastructure may provide data regarding traffic signals, roadway access points, roadway cameras, and databases regarding road conditions, weather, or traffic. For example, road condition data may include a pothole, sinkhole, uneven pavement, frost heave, ice patch, oil spill or other roadway hazard. Another example is a state of a traffic light such as a color of light shining on each leg of the roadway at an intersection. The traffic light proximate to an accident, is a traffic light being within a predetermined distance from the accident. This exemplary illustration is of a processor or controller in a vehicle that determines a degree to which a driver of the vehicle is at fault for the accident, however the determination of fault may also be preformed in the roadway infrastructure in systems such as a network cloud computing system, or a server.

A message broadcasted by the system may include a field, the field of the message associated with a nature or classification of the accident, vehicle data and driver data.

A message transmitted from the vehicle 202 may be transmitted via radio frequency (RF) signals. The energy of the RF signals is greater at a distance close to the vehicle 202 and the energy of the signal is reduced as the location from the vehicle 202 is increased. For example, an RF signal 210 will have different energies at different distances from the vehicle 202. At a circumference close to the vehicle 202, as illustrated as 210A, the energy is typically higher than the energy at a circumference further away from the vehicle 202, as illustrated as 210B, 210C, and 210D. Also, there is a limit to the effective range of the RF signals, as illustrated by 210D. When the RF signal is transmitted, it may be received by vehicles and vehicle infrastructure within the range of the RF signals 222D, such as vehicles 206A, 206B, and 206C however, it may not be received by all the vehicles on the roadway such as vehicle 206D and the emergency vehicle 208. Vehicle 204 may also transmit RF signals such that energy of the RF signals will be different at different distances from the vehicle as shown by 224A-224D. The energy will typically be less as a function of the distance from the transmitting vehicle 204.

The vehicle may gather data from a phone and other device including an infotainment system and forward that data to the infrastructure. The data sent to the infrastructure may include public data such as a license plate or Vehicle Identification Number (VIN) and secure data such as vehicle data and driver data Also, the information may include both open and encrypted information, such that some information may be decrypted by the controller and confidentially transmitted to other agencies. For example, some driver data such as personal data may be encrypted to limit access to those who have the encryption key. The encrypted data may be received by other vehicles (204, 206A-D, and 208), however the vehicle receiving the data may not have the key to decrypt the data and therefore, obscure the meaning of the data while encrypted. This encryption mechanism would provide security of confidential information including medical information, insurance information, personal information, and financial information. A key may be in the form of a time or a location of an accident such that transmitted data may be decrypted by other vehicles involved in the accident.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising: a controller configured to, responsive to an accident, transmit a parameter indicating a percentage responsibility of the vehicle for the accident that is based on data collected by an other vehicle in a vicinity of the vehicle at a time of the accident and a number of a plurality of keypad presses within a predetermined time before the accident such that the percentage responsibility increases as the number increases.

2. The vehicle of claim 1, wherein the data includes a speed of the other vehicle at the time of the accident, a profile of speed of the other vehicle within a predetermined window of time encompassing the time of the accident, or a profile of braking force of the other vehicle within a predetermined window of time encompassing the time of the accident.

3. The vehicle of claim 2, wherein the percentage responsibility is further based on a difference between the speed of the other vehicle and a speed limit at a location and the time of the accident.

4. The vehicle of claim 1, wherein the percentage responsibility is further based on infotainment data collected within a predetermined window of time encompassing the time of the accident.

5. The vehicle of claim 1, wherein the percentage responsibility is further based on infotainment data from the other vehicle collected within a predetermined window of time encompassing the time of the accident, and includes a log of text messages transferred to a phone, a signal indicative of phone activity, or a signal indicative of hands-free operation of the phone.

6. The vehicle of claim 1, wherein the percentage responsibility is further based on a state of a traffic light proximate to a location of the vehicle within a predetermined window of time encompassing the time of the accident.

7. A vehicle comprising: at least one controller configured to, responsive to an accident, derive a parameter indicating a percentage responsibility of the vehicle for the accident from data from an other vehicle and a number of a plurality of presses of a keypad within a predetermined time before the accident such that the percentage responsibility increases as the number increases, and transmit the parameter.

8. The vehicle of claim 7, wherein the data includes a speed of the other vehicle at a time of the accident, a profile of speed of the other vehicle within a predetermined window of time encompassing the time of the accident, or a profile of braking force of the other vehicle within a predetermined window of time encompassing the time of the accident.

9. The vehicle of claim 8, wherein the percentage responsibility is further based on a difference between the speed of the other vehicle and a speed limit at a location and the time of the accident.

10. The vehicle of claim 7, wherein the percentage responsibility is further based on infotainment data collected from the other vehicle within a predetermined window of time encompassing a time of the accident.

11. The vehicle of claim 7, wherein the percentage responsibility is further based on infotainment data collected from the other vehicle, and includes a log of text messages transferred to a phone, a log indicative of presses, a signal indicative of phone activity, or a signal indicative of hands-free operation of the phone.

12. A method comprising: receiving infotainment data, recorded at a time of an accident and a predetermined time prior to the accident, from an other vehicle in a vicinity of a vehicle; and transmitting, via an RF transmitter, a parameter indicating a percentage responsibility of the vehicle for the accident that is based on the infotainment data and a number of a plurality of presses of a keypad within a predetermined time before the accident.

13. The method of claim 12 further comprising receiving infrastructure data from a vehicle infrastructure indicative of at least one characteristic of a roadway in a vicinity of the vehicle, and wherein the percentage responsibility is further based on the infrastructure data.

14. The method of claim 13 further comprising receiving, from the other vehicle, vehicle data that includes a speed of the other vehicle at the time of the accident, a profile of speed of the other vehicle within a predetermined window of time encompassing the time of the accident, or a profile of braking force of the other vehicle within a predetermined window of time encompassing the time of the accident, wherein the percentage responsibility is further based on the vehicle data.

15. The method of claim 14, wherein the infotainment data includes a log of text messages transferred to a phone, a signal indicative of phone activity, or a signal indicative of hands-free operation of the phone.

\* \* \* \* \*